(12) United States Patent
Duan et al.

(10) Patent No.: US 11,967,442 B2
(45) Date of Patent: Apr. 23, 2024

(54) SKIN LAYER OF SUPERCONDUCTING TAPE, SUPERCONDUCTING TAPE, AND SUPERCONDUCTING COIL

(71) Applicants: GUANGDONG POWER GRID CO., LTD., Guangdong (CN); ELECTRIC POWER RESEARCH INSTITUTE OF GUANGDONG POWER GRID CO., LTD., Guangdong (CN)

(72) Inventors: Xinhui Duan, Guangdong (CN); Lianhong Zhong, Guangdong (CN); Yongfa Zhao, Guangdong (CN); Meng Song, Guangdong (CN); Bing Zhao, Guangdong (CN); Xiaoqing Xiao, Guangdong (CN); Chao Sheng, Guangdong (CN); Jian Zhang, Guangdong (CN); Li Li, Guangdong (CN); Yunsong Luo, Guangdong (CN)

(73) Assignees: GUANGDONG POWER GRID CO., LTD., Guangdong (CN); ELECTRIC POWER RESEARCH INSTITUTE OF GUANGDONG POWER GRID CO., LTD, Guangdong (CN)

( * ) Notice: Subject to any disclaimer, the term of this patent is extended or adjusted under 35 U.S.C. 154(b) by 444 days.

(21) Appl. No.: 16/972,490

(22) PCT Filed: Aug. 30, 2019

(86) PCT No.: PCT/CN2019/103640
§ 371 (c)(1),
(2) Date: Dec. 4, 2020

(87) PCT Pub. No.: WO2020/093770
PCT Pub. Date: May 14, 2020

(65) Prior Publication Data
US 2021/0272721 A1 Sep. 2, 2021

(30) Foreign Application Priority Data

Nov. 9, 2018 (CN) .......................... 201811334246

(51) Int. Cl.
*H01B 12/02* (2006.01)
(52) U.S. Cl.
CPC ................................ *H01B 12/02* (2013.01)
(58) Field of Classification Search
CPC ...................................................... H01B 12/02
See application file for complete search history.

(56) References Cited

U.S. PATENT DOCUMENTS

| | | | | | |
|---|---|---|---|---|---|
| 5,749,308 | A | * | 5/1998 | Bachik | F23G 5/00 110/165 A |
| 2007/0015666 | A1 | * | 1/2007 | Hans Thieme | H10N 60/203 29/599 |
| 2015/0065350 | A1 | * | 3/2015 | Hobl | H10N 60/30 505/211 |

FOREIGN PATENT DOCUMENTS

| | | |
|---|---|---|
| CN | 102117679 A | 7/2011 |
| CN | 104040743 A | 9/2014 |

(Continued)

OTHER PUBLICATIONS

PCT/CN2019/103640 Search Report dated Nov. 15, 2019.
Chinese Patent Office Action for Application No. 201811334246.7, dated Dec. 1, 2023 (12 pages, including translation).

*Primary Examiner* — Paul A Wartalowicz
(74) *Attorney, Agent, or Firm* — Michael Best & Friedrich LLP

(57) ABSTRACT

A skin layer of a superconducting tape has a woven mesh structure and is disposed on a surface of a superconducting tape. The skin layer of a superconducting tape solves the problem where a vapor layer generated when a superconductor is in a normal resistive state greatly reduces the (Continued)

efficiency of a heat exchange between the superconductor and liquid nitrogen. Further provided are the superconducting tape and a superconducting coil.

17 Claims, 2 Drawing Sheets

(56) References Cited

FOREIGN PATENT DOCUMENTS

| | | |
|---|---|---|
| CN | 108447616 A | 8/2018 |
| CN | 109300610 A | 2/2019 |
| CN | 208796724 A | 4/2019 |
| CN | 208796724 U | 4/2019 |
| JP | S58117608 A | 7/1983 |
| JP | H1125773 A | 1/1999 |
| WO | 3107448 A1 | 12/2003 |

* cited by examiner

SKIN LAYER OF SUPERCONDUCTING TAPE, SUPERCONDUCTING TAPE, AND SUPERCONDUCTING COIL

CROSS-REFERENCES TO RELATED APPLICATIONS

This application is a national stage application filed under 35 U.S.C. 371 based on International Patent Application No. PCT/CN2019/103640, filed on Aug. 30, 2019, which claims priority to Chinese Patent Application No. 201811334246.7 and filed with the CNIPA on Nov. 9, 2018, the disclosures of which are incorporated herein by reference in their entireties.

TECHNICAL FIELD

The present application relates to the field of electrical technologies and, in particular, to a skin layer of a superconducting tape, the superconducting tape and a superconducting coil.

BACKGROUND

A resistive superconducting fault current limiter is an electrical device that works by use of the superconducting state-normal state transition characteristic of a superconducting tape. When an electric current is normally transmitted through a power grid, a conductor used in a current-limiting unit of the resistive superconducting fault current limiter is in a superconducting state, and the electric current can be transmitted almost without any loss. When the power grid faults and a short-circuit current is generated, a large short-circuit current will cause the conductor used in the current-limiting unit of the resistive superconducting fault current limiter to change to a normal state and exhibit larger resistance, thereby increasing the systematic short-circuit impedance of the power grid and suppressing the amplitude of a short-circuit fault current. Since a lot of heat is generated when a superconducting element quenches in a current-limiting state, a reliable heat removal mechanism is required. At present, most resistive superconducting fault current limiters adopt liquid nitrogen (−196° C.) as a cooling medium. When the current-limiting unit changes to the normal resistive state, the heat generated by the conductor will quickly increase the temperature of the conductor, so that the liquid nitrogen is vaporized in large amounts and a vapor layer generated after vaporization adheres to the surface of the conductor, greatly affecting the efficiency of a heat exchange between the conductor and the liquid nitrogen.

SUMMARY

The embodiments of the present application provide a skin layer of a superconducting tape, which solves the problem where a vapor layer generated when a superconductor is in a normal resistive state greatly reduces the efficiency of a heat exchange between the superconductor and liquid nitrogen. The embodiments of the present application further provide the superconducting tape and a superconducting coil.

In view of this, a first aspect of the present application provides a skin layer of a superconducting tape, including a woven mesh structure and disposed on a surface of the superconducting tape.

Optionally, the woven mesh structure has a woven mesh opening of 5 $mm^2$ to 15 $mm^2$.

Optionally, the woven mesh structure is a non-magnetic metallic woven mesh.

Optionally, the non-magnetic metallic woven mesh has a filament diameter of 0.1 mm to 0.5 mm.

Optionally, the non-magnetic metallic woven mesh is attached to a wide tape surface of the superconducting tape.

Optionally, the non-magnetic woven mesh is a low-temperature resistant non-metallic woven mesh.

Optionally, the low-temperature resistant non-metallic woven mesh is wrapped on the superconducting tape along a length direction of the superconducting tape.

Optionally, the low-temperature resistant non-metallic woven mesh has a wrapping gap of 1 mm to 2 mm.

A second aspect of the present application provides the superconducting tape, including the skin layer of the superconducting tape, disposed on the surface of the superconducting tape, provided in the first aspect.

A third aspect of the present application provides a superconducting coil, which is formed by winding the superconducting tape provided in the second aspect.

As can be seen from the preceding solutions, the embodiments of the present application have advantages described below.

The embodiments of the present application provide the skin layer of the superconducting tape, which is disposed on the surface of the superconducting tape and has the woven mesh structure. When the superconducting tape is in a normal resistive state and generates a lot of heat, liquid nitrogen surrounding the superconducting tape is vaporized in large amounts. Since the skin layer, which has the woven mesh structure, of the superconducting tape is disposed on the surface of the superconducting tape, the vaporized liquid nitrogen cannot form a large-area vapor layer on the surface of the superconducting tape and can only form bubbles under the effect of the woven mesh; and the bubbles can spread relatively quickly, so that the efficiency of a heat exchange between the superconducting tape and the liquid nitrogen is greatly improved.

BRIEF DESCRIPTION OF DRAWINGS

To illustrate the solutions in the embodiments of the present application or the solutions in the existing art more clearly, the drawings used in the description of the embodiments or the existing art will be briefly described below. Apparently, the drawings described below illustrate part of the embodiments of the present application, and those of ordinary skill in the art may obtain other drawings based on the drawings described below on the premise that no creative work is done.

Figure 1:
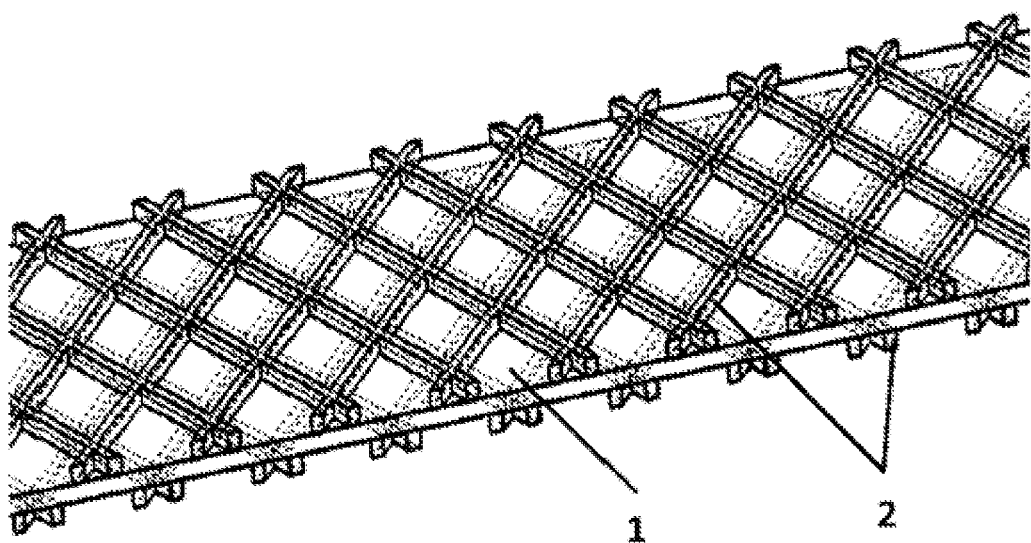
FIG. 1 is a structural diagram of a first embodiment of a skin layer of a superconducting tape provided by the present application.

REFERENCE LIST 1 superconducting tape
2 non-magnetic metallic woven mesh
3 low-temperature resistant non-metallic woven mesh

DETAILED DESCRIPTION

The solutions in the embodiments of the present application are described clearly and completely in conjunction with the drawings. Apparently, the embodiments described herein are part, not all, of the embodiments of the present application. Based on the embodiments of the present application, all other embodiments obtained by those of ordinary skill in the art without creative work are within the scope of the present application.

In the description of the embodiments of the present application, it is to be noted that orientations or position relations indicated by terms such as "central", "upper", "lower", "left", "right", "vertical", "horizontal", "in" and "out" are orientations or position relations based on the drawings. These orientations or position relations are intended only to facilitate and simplify the description of the embodiments of the present application and not to indicate or imply that a device or element referred to must have such specific orientations or must be configured or operated in such specific orientations. Thus, these orientations or position relations are not to be construed as limiting the embodiments of the present application. In addition, terms such as "first", "second" and "third" are only for description and not to be construed as indicating or implying relative importance.

In the description of the embodiments of the present application, it is to be noted that unless otherwise expressly specified and limited, the term "installed", "connected to each other" or "connected" should be construed in a broad sense as securely connected, detachably connected or integrally connected; mechanically connected or electrically connected; directly connected to each other or indirectly connected to each other via an intermediary; or intraconnected between two components. For those of ordinary skill in the art, specific meanings of the preceding terms in the embodiments of the present application may be understood based on specific situations.

When a superconducting tape generates a large amount of heat, a large-area vapor layer is formed between the superconducting tape and liquid nitrogen. The vapor layer is equivalent to a heat blocking layer which hinders a heat exchange between the superconducting tape and the liquid nitrogen. Therefore, the heat exchange between the superconducting tape and the liquid nitrogen may be restored by destroying the vapor layer.

Forced flow cooling is generally adopted in conventional cooling devices, that is, an external circulation tube is added to enable a cooling medium to flow in a structure to be cooled to destroy the formed vapor layer, thereby improving the efficiency of a heat exchange between the structure to be cooled and the cooling medium. However, such forced flow cooling systems require an auxiliary circulation component to be added outside devices, resulting in relatively complicated structures and relatively high costs of the devices.

The embodiments of the present application provide a skin layer of the superconducting tape, which provides a solution to the preceding problem from the perspective of preventing the vapor layer from being generated.

A basic condition for the formation of the vapor layer is that the surface of the superconducting tape is continuous and smooth. If this condition is broken, the vapor layer can be prevented from being generated to a large extent. As a specific implementation, the skin layer of the superconducting tape with a woven mesh structure may be disposed on the surface of the superconducting tape. The skin layer of the superconducting tape with the woven mesh structure may divide the surface of the superconducting tape into multiple grids, so that the surface of the superconducting tape is no longer continuous and smooth, and the vaporized liquid nitrogen can only form bubbles rather than the large-area vapor layer.

A woven mesh opening of the skin layer of the superconducting tape should neither too small nor too large. Experiments have found that if the woven mesh is too large, specifically, has an area greater than 15 $mm^2$, the vaporized liquid nitrogen will form large bubbles which adhere to the surface of the superconducting tape and cannot spread, and this is equivalent to a failure to prevent the vapor layer from being generated; if the area of the woven mesh is too small, specifically, less than 5 $mm^2$, the skin layer of the superconducting tape has too dense grids which cover most of the surface of the superconducting tape, so that an area for a heat exchange between the superconducting tape and the liquid nitrogen is insufficient, and the efficiency of the heat exchange is greatly reduced. Therefore, the area of the woven mesh may range between 5 $mm^2$ to 15 $mm^2$. It is to be noted that the range of 5 $mm^2$ to 15 $mm^2$ includes 5 $mm^2$ and 15 $mm^2$. Unless otherwise specified, the range between two numbers recorded in the present application includes the two numbers themselves.

Reference is made to FIG. 1 which is a structural diagram of a first embodiment of the skin layer of the superconducting tape provided by the present application.

In this embodiment, the skin layer of the superconducting tape may be a non-magnetic metallic woven mesh 2. There are many kinds of non-magnetic metals such as copper and aluminum. The non-magnetic metallic woven mesh 2 may be formed by weaving non-magnetic metal filaments and serves as the skin layer of the superconducting tape.

Considering that the superconducting tape 1 generally needs to be bent, for example, the superconducting tape 1 is wound to form a superconducting coil, the woven mesh structure of the non-magnetic metallic woven mesh 2 should not limit the bending of the superconducting tape 1. An appropriate filament diameter may be set for the non-magnetic metallic woven mesh 2, so that the non-magnetic metallic woven mesh 2 has appropriate hardness. Specifically, the filament diameter of the non-magnetic metallic woven mesh 2 may be configured to range between 0.1 mm and 0.5 mm, since the woven mesh with too small a filament diameter might have insufficient strength and easily break, and the woven mesh with too large a filament diameter might be difficult to bend and so the superconducting tape 1 is difficult to bend.

The woven mesh made of metals has greater hardness. When the woven mesh is disposed on the superconducting tape 1, the non-magnetic metallic woven mesh 2 may be cut into a strip with a width slightly narrower than a width of the superconducting tape 1 by 1 mm to 2 mm, so that the non-magnetic metallic woven mesh 2 is attached to a wide tape surface of the superconducting tape 1. It is to be noted that a surface defined by the length and the width of the superconducting tape 1 is the wide tape surface. There are two such wide tape surfaces. When the superconducting tape 1 is flat-laid, the two wide tape surfaces are an upper wide tape surface and a lower wide tape surface respectively. Two non-magnetic metallic woven meshes 2 may be attached to the upper wide tape surface and the lower wide tape surface of the superconducting tape 1 respectively.

The non-magnetic metallic woven mesh 2 may be attached in normal contact to the superconducting tape 1. For more secure attaching, thin threads may be bound to ends of the superconducting tape 1 to further attach the non-magnetic metallic woven mesh 2 and the superconducting tape 1 together. In the process of forming the superconducting coil through winding, a pressing force between an inner superconducting tape 1 and an outer superconducting tape 1 may also be used for strengthening the attaching of the non-magnetic metallic woven mesh 2.

It is understandable that the non-magnetic metallic woven mesh 2 is made of metals and has relatively high thermal conductivity. Therefore, when the non-magnetic metallic woven mesh 2 is attached to the surface of the superconducting tape 1, heat generated by the superconducting tape 1 will be quickly conducted to the non-magnetic metallic woven mesh 2, which is equivalent to an increase in the area for the heat exchange between the superconducting tape 1 and a surrounding low-temperature medium such as the liquid nitrogen. Moreover, since the non-magnetic metallic woven mesh 2 made of metal materials will affect the overall resistivity of the superconducting tape 1 after closely attached to the surface of the superconducting tape 1, the non-magnetic metallic woven mesh 2 is applicable to steady-state superconducting magnets with high thermal stability requirements.

The following is a specific application example for the first embodiment of the present application.

The superconducting tape 1 may be an ST-12-L yttrium barium copper oxide (YBCO) tape with a width of 12 mm and a thickness of 0.3 mm. The superconducting tape 1 is encapsulated in stainless steel, has relatively high resistivity at room temperature, and is applied to make a resistive superconducting fault current limiter. The non-magnetic metallic woven mesh 2 may be made of copper materials, has a mesh opening area of about 8 $mm^2$, a filament diameter of about 0.3 mm and a width of 11 mm, and be divided into an upper layer and a lower layer. The upper layer and the lower layer of the non-magnetic metallic woven mesh 2 are respectively attached to the upper wide tape surface and the lower wide tape surface of the superconducting tape 1. The non-magnetic metallic woven mesh 2 is connected in normal contact to the superconducting tape 1 and secured by pressing the outer superconducting tape 1 against the inner superconducting tape 1 after the superconducting tape 1 is wound into a coil. Thin glass fiber threads are bound to the ends.

Figure 2:
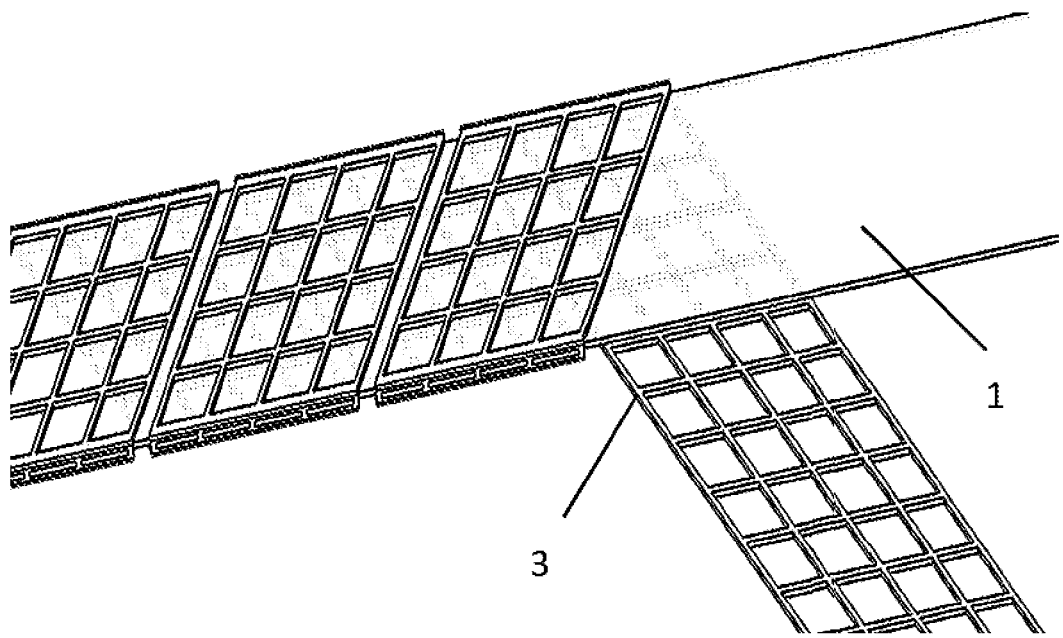
FIG. 2 is a structural diagram of a second embodiment of a skin layer of a superconducting tape provided by the present application.

The above is a detailed description of the first embodiment of the skin layer of the superconducting tape provided by the present application. Reference is made below to FIG. 2 which is a structural diagram of a second embodiment of the skin layer of the superconducting tape provided by the present application.

In this embodiment, the skin layer of the superconducting tape may be a low-temperature resistant non-metallic woven mesh 3. Considering that the superconducting tape 1 is in a low-temperature cooling medium for a long time, the skin layer of the superconducting tape needs to be able to withstand low temperatures and have relatively high strength at low temperatures. The low-temperature resistant non-metallic woven mesh 3 may be made of a low-temperature resistant high molecular polymer such as thermoplastic polyurethane (TPU) elastomer rubber or glass fiber.

Different from the non-magnetic metallic woven mesh 2 in the first embodiment described above, the low-temperature resistant non-metallic woven mesh 3 is made of non-metallic materials and softer in texture. Therefore, a manner for connecting the low-temperature resistant non-metallic woven mesh 3 to the superconducting tape 1 may be a wrapping connection, that is, the low-temperature resistant non-metallic woven mesh 3 may be wrapped on the superconducting tape 1 along a length direction of the superconducting tape 1. At this time, the low-temperature resistant non-metallic woven mesh 3 is equivalent to a belt and can be continuously wrapped around the superconducting tape 1 one circle after another.

It is to be noted that when the wrapping manner is adopted, a wrapping angle needs to be determined according to a width of the superconducting tape 1 and a width of the used low-temperature resistant non-metallic woven mesh 3, such that a wrapping gap is 1 mm to 2 mm. This is because too small a gap will hinder a heat exchange at the gap and too large a gap might cause a relatively large vapor layer to form at the gap.

The width of the low-temperature resistant non-metallic woven mesh 3 may vary within a certain range. Assuming that the width of the used superconducting tape is d, the low-temperature resistant non-metallic woven mesh 3 with a width of d to 2d may generally be used for wrapping. On the other hand, a thickness of the low-temperature resistant non-metallic woven mesh 3 should generally not be greater than 0.5 mm, that is to say, a filament diameter of the low-temperature resistant non-metallic woven mesh 3 should not be greater than 0.5 mm, otherwise the overall heat exchange effect will be affected.

Identical to the first embodiment, the low-temperature resistant non-metallic woven mesh 3 may also be attached in normal contact to the superconducting tape 1, thin threads may also be bound to ends of the superconducting tape 1 to enhance the attaching effect, and a pressing force between an inner superconducting tape 1 and an outer superconducting tape 1 may also be used for strengthening attaching.

The non-magnetic metallic woven mesh 2 may be attached in normal contact to the superconducting tape 1. For more secure attaching, thin threads may be bound to the ends of the superconducting tape 1 to further attach them together. In the process of forming the superconducting coil through winding, the pressing force between the inner superconducting tape 1 and the outer superconducting tape 1 may also be used for strengthening the attaching of the non-magnetic metallic woven mesh 2.

The following is a specific application example for the second embodiment of the present application.

The superconducting tape 1 may be an ST-12-L yttrium barium copper oxide (YBCO) tape with a width of 12 mm and a thickness of 0.3 mm. The superconducting tape 1 is encapsulated in stainless steel, has relatively high resistivity at room temperature, and may be applied to make a resistive superconducting fault current limiter. The low-temperature resistant non-metallic woven mesh 3 may be made of glass fiber and has a mesh opening area of about 6 $mm^2$ and a filament diameter of about 0.2 mm. The woven mesh of glass fiber has a width of 12 mm and is clad on the surface of the superconducting tape 1 in a wrapping manner. A gap between adjacent cladding layers (that is, the wrapping gap) is 1 mm. The woven mesh of glass fiber is connected in normal contact to the superconducting tape 1 and secured by pressing the outer superconducting tape 1 against the inner superconducting tape 1 after the superconducting tape 1 is wound into a coil. Thin glass fiber threads are bound to the ends.

Figure 3:
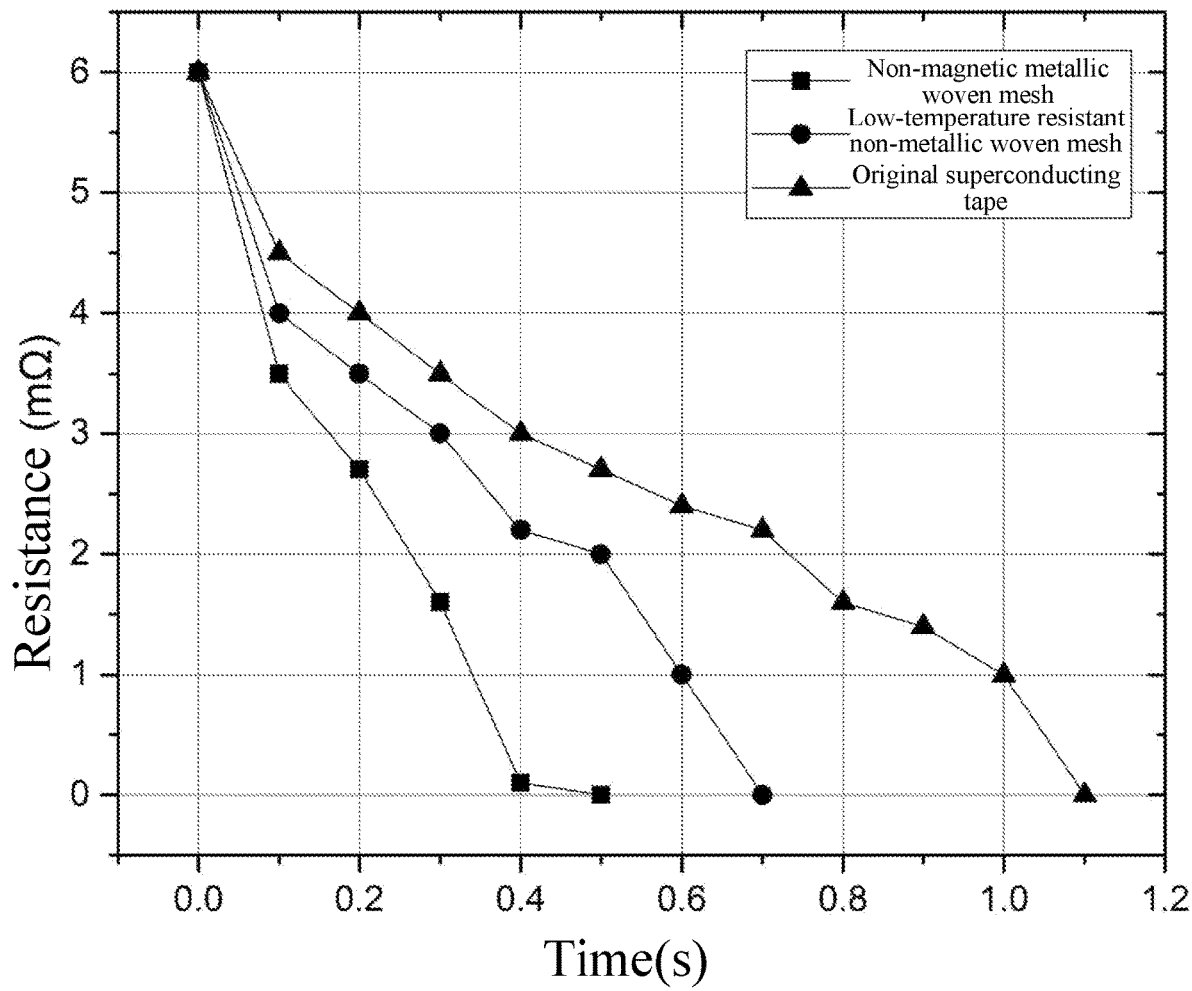
FIG. 3 is a comparison diagram of quench recovery curves for a superconducting tape with a non-magnetic metallic woven mesh, a superconducting tape with a low-temperature resistant non-metallic woven mesh and an original superconducting tape.

An application effect of the skin layer of the superconducting tape provided by the present application is described below with reference to FIG. 3. FIG. 3 is a comparison diagram of quench recovery curves for a superconducting tape with a non-magnetic metallic woven mesh, a superconducting tape with a low-temperature resistant non-metallic woven mesh and an original superconducting tape.

A quench recovery refers to a process in which the superconducting tape 1 changes from a normal resistive state to a zero-resistance superconducting state. As can be seen from comparative experiments, under the same experimental conditions, it takes 1.1 s for the original superconducting tape 1 without the skin layer of the superconducting tape provided by the present application to recover from the resistive state to the superconducting state, it takes 0.5 s for the superconducting tape 1 with the non-magnetic metallic woven mesh 2 to recover from the resistive state to the superconducting state, and it takes 0.7 s for the superconducting tape 1 with the low-temperature resistant non-metallic woven mesh 3 to recover from the resistive state to the superconducting state. It can be seen that the quench recovery time for the superconducting tape 1 with the skin layer of the superconducting tape provided by the present application can be effectively reduced, which improves the thermal stability of the superconducting tape 1 and is of great significance for the application of superconducting power devices such as superconducting fault current limiters, superconducting cables and superconducting transformers.

Further, it can be seen that the superconducting tape 1 with the non-magnetic metallic woven mesh 2 has a stronger quench recovery ability than the superconducting tape 1 with the low-temperature resistant non-metallic woven mesh 3 for the reason that the non-magnetic metallic woven mesh 2 has higher thermal conductivity, which is equivalent to an increase in an area for a heat exchange between the superconducting tape 1 and liquid nitrogen, while the low-temperature resistant non-metallic woven mesh 3 has lower thermal conductivity and hinders the heat exchange between the superconducting tape 1 and the liquid nitrogen to a certain extent. However, the low-temperature resistant non-metallic woven mesh 3 has better electrical insulation performance than the non-magnetic metallic woven mesh 2 and thus has application values for the superconducting fault current limiters, the superconducting transformers and the like; and the non-magnetic metallic woven mesh 2 can improve the overall thermal stability and has application values for the superconducting cables and the like.

The embodiments of the present application provide the skin layer of the superconducting tape, which has the woven mesh structure and may be disposed on the surface of the superconducting tape. When the superconducting tape is in the normal resistive state and generates a lot of heat, the liquid nitrogen surrounding the superconducting tape is vaporized in large amounts. Since the surface of the superconducting tape is provided with the skin layer of the superconducting tape which has the woven mesh structure, the vaporized liquid nitrogen cannot form the large-area vapor layer on the surface of the superconducting tape and can only form bubbles under the effect of the woven mesh; and the bubbles can spread quickly, so that the efficiency of the heat exchange between the superconducting tape and the liquid nitrogen is greatly improved.

The embodiments of the present application further provide a superconducting tape, a surface of which is provided with any skin layer of the superconducting tape described above.

The embodiments of the present application further provide a superconducting coil, which is formed by winding the superconducting tape provided by the present application.

Terms such as "first", "second", "third" and "fourth" (if present) in the description and the above drawings of the present application are used for distinguishing between similar objects and not necessarily used for describing a particular order or sequence. It should be understood that data used in this way is interchangeable when appropriate so that the embodiments of the present application described herein can be implemented in a sequence not illustrated or described herein, for example. In addition, terms "including" and "having" or any variations thereof are intended to encompass a non-exclusive inclusion. For example, a process, method, system, product or apparatus that includes a series of steps or units not only includes the expressly listed steps or units but may also include other steps or units that are not expressly listed or are inherent to such a process, method, system, product or apparatus.

It should be understood that in the present application, "at least one" refers to one or more and "multiple" refers to two or more. "And/or" is used for describing an association between associated objects and indicates three relations, for example, "A and/or B" may indicate the presence of A alone, the presence of B alone and the presence of both A and B, where A and B may be singular or plural. The character "I" generally indicates an "or" relation between associated objects. "At least one of the following" or a similar expression thereof refers to any combination of items, including any combination of singular items or plural items. For example, at least one of a, b or c may indicate a, b, c, "a and b", "a and c", "b and c" or "a and b and c", where a, b and c may be singular or plural.

What is claimed is:

1. A skin layer of a superconducting tape, comprising a woven mesh structure and disposed on a surface of the superconducting tape;
    wherein the woven mesh structure has a woven mesh opening of 5 mm$^2$ to 15 mm$^2$ to prevent a formation of a vapor layer of liquid nitrogen and ensure a heat exchange between the superconducting tape and the liquid nitrogen.

2. The skin layer of the superconducting tape according to claim 1, wherein the woven mesh structure is a non-magnetic metallic woven mesh.

3. The skin layer of the superconducting tape according to claim 2, wherein the non-magnetic metallic woven mesh has a filament diameter of 0.1 mm to 0.5 mm.

4. The skin layer of the superconducting tape according to claim 2, wherein the non-magnetic metallic woven mesh is attached to a wide tape surface of the superconducting tape.

5. The skin layer of the superconducting tape according to claim 1, wherein the woven mesh structure is a low-temperature resistant non-metallic woven mesh.

6. The skin layer of the superconducting tape according to claim 5, wherein the low-temperature resistant non-metallic woven mesh is wrapped on the superconducting tape along a length direction of the superconducting tape.

7. The skin layer of the superconducting tape according to claim 5, wherein the low-temperature resistant non-metallic woven mesh has a wrapping gap of 1 mm to 2 mm.

8. A superconducting tape, comprising a skin layer of the superconducting tape disposed on a surface of the superconducting tape, wherein the skin layer of the superconducting tape comprises a woven mesh structure;
    wherein the woven mesh structure has a woven mesh opening of 5 mm$^2$ to 15 mm$^2$ to prevent a formation of a vapor layer of liquid nitrogen and ensure a heat exchange between the superconducting tape and the liquid nitrogen.

9. The superconducting tape according to claim 8, wherein the woven mesh structure is a non-magnetic metallic woven mesh.

10. The superconducting tape according to claim 9, wherein the non-magnetic metallic woven mesh has a filament diameter of 0.1 mm to 0.5 mm.

11. The superconducting tape according to claim 9, wherein the non-magnetic metallic woven mesh is attached to a wide tape surface of the superconducting tape.

12. The superconducting tape according to claim 8, wherein the woven mesh structure is a low-temperature resistant non-metallic woven mesh.

13. The superconducting tape according to claim 12, wherein the low-temperature resistant non-metallic woven mesh is wrapped on the superconducting tape along a length direction of the superconducting tape.

14. The superconducting tape according to claim 12, wherein the low-temperature resistant non-metallic woven mesh has a wrapping gap of 1 mm to 2 mm.

15. A superconducting coil, which is formed by winding a superconducting tape, wherein the superconducting tape comprises a skin layer of the superconducting tape disposed on a surface of the superconducting tape, wherein the skin layer of the superconducting tape comprises a woven mesh structure;

wherein the woven mesh structure has a woven mesh opening of 5 $mm^2$ to 15 $mm^2$ to prevent a formation of a vapor layer of liquid nitrogen and ensure a heat exchange between the superconducting tape and the liquid nitrogen.

16. The superconducting coil according to claim 15, wherein the woven mesh structure is a non-magnetic metallic woven mesh.

17. The superconducting coil according to claim 16, wherein the non-magnetic metallic woven mesh has a filament diameter of 0.1 mm to 0.5 mm.

* * * * *